(12) United States Patent
Sunder et al.

(10) Patent No.: US 10,634,626 B2
(45) Date of Patent: Apr. 28, 2020

(54) APPARATUS AND METHOD FOR INDUCING HIGH-SPEED VARIABLE-TILT WOBBLE MOTIONS

(71) Applicant: International Business Machines Corporation, Armonk, NY (US)

(72) Inventors: Madhana Sunder, Poughkeepsie, NY (US); Conor R. Thomas, Woodbury, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 16/139,634

(22) Filed: Sep. 24, 2018

(65) Prior Publication Data

US 2020/0096459 A1 Mar. 26, 2020

(51) Int. Cl.
*G01N 23/207* (2018.01)
*G01N 23/20025* (2018.01)
*G01N 23/205* (2018.01)

(52) U.S. Cl.
CPC ..... *G01N 23/20025* (2013.01); *G01N 23/205* (2013.01); *G01N 2223/0566* (2013.01); *G01N 2223/1016* (2013.01); *G01N 2223/309* (2013.01); *G01N 2223/331* (2013.01); *G01N 2223/50* (2013.01); *G01N 2223/605* (2013.01)

(58) Field of Classification Search
None
See application file for complete search history.

(56) References Cited

U.S. PATENT DOCUMENTS

| | | |
|---|---|---|
| 5,787,146 A | 7/1998 | Giebeler |
| 6,721,393 B1 | 4/2004 | Brauss |
| 6,996,208 B2 | 2/2006 | Helming et al. |
| 7,242,744 B2 | 7/2007 | Brauss |
| 8,111,807 B2 | 2/2012 | Ida et al. |
| 9,506,880 B2 | 11/2016 | Beckers et al. |
| 2004/0208283 A1 | 10/2004 | Helming et al. |

(Continued)

FOREIGN PATENT DOCUMENTS

| | | |
|---|---|---|
| EP | 1 469 304 A2 | 10/2004 |
| EP | 3 077 162 B1 | 2/2018 |
| WO | 2011/053692 A1 | 5/2011 |

OTHER PUBLICATIONS

Willmott, P. R., et al. "The Materials Science beamline upgrade at the Swiss Light Source" Journal of Synchrotron Radiation, 20, 667-682 (Jul. 2013).

*Primary Examiner* — Hoon K Song (74) *Attorney, Agent, or Firm* — Scully, Scott, Murphy & Presser, P.C.; Erik Johnson, Esq.

(57) ABSTRACT

An apparatus and method for inducing high-speed wobble motions to a sample of interest is provided. After the sample is securely attached to a sample mounting block, the sample is variably tilted by using a hexapod stage and simultaneously rotated at a high speed about a rotation axis that is substantially perpendicular to a planar top surface of the hexapod stage. The position of the sample is continuously adjusted during the wobble motion to align a surface center of the sample with a testing center of an X-ray diffractometer. The simultaneous variable tilting and high-speed rotation of the sample induces wobble motions to the sample for randomizing orientations of a sample material's crystallites relative to the source and detector of an X-ray diffractometer.

19 Claims, 4 Drawing Sheets

(56) References Cited

U.S. PATENT DOCUMENTS

| | | |
|---|---|---|
| 2005/0195942 A1 | 9/2005 | Brauss |
| 2011/0064199 A1 | 3/2011 | Ida et al. |
| 2013/0138382 A1* | 5/2013 | Mitsunaga ............... G06F 17/00 702/123 |
| 2015/0003592 A1 | 1/2015 | Beckers et al. |
| 2015/0276629 A1* | 10/2015 | Ruf .................. G01N 23/20075 378/73 |
| 2016/0320319 A1 | 11/2016 | Hench et al. |
| 2019/0094159 A1* | 3/2019 | Sunder ............. G01N 23/20016 |
| 2019/0113468 A1* | 4/2019 | Hoenes ............ G01N 23/20008 |

* cited by examiner

```
┌─────────────────────────────────────────────────────────────┐
│   Securely supporting the sample on a sample mounting block │
│                            510                              │
└─────────────────────────────────────────────────────────────┘
                              ↓
┌─────────────────────────────────────────────────────────────┐
│   Tilting the sample in variable manner by using a hexapod stage │
│                            520                              │
└─────────────────────────────────────────────────────────────┘
                              ↓
┌─────────────────────────────────────────────────────────────┐
│   Simultaneously rotating the sample about a rotation axis that is │
│   substantially perpendicular to a planar top surface of the hexapod │
│   stage, thereby inducing wobble motions to the sample, such that │
│   orientations of crystallites of a material of the         │
│   sample can be randomized                                  │
│                            530                              │
└─────────────────────────────────────────────────────────────┘
                              ↓
┌─────────────────────────────────────────────────────────────┐
│   Simultaneously adjusting the position of the sample to align a │
│   surface center of the sample with a testing center of an X-ray │
│   diffractometer in a space defined by a longitudinal axis, a lateral │
│   axis and a vertical axis, during the tilting and rotation of the sample │
│                            540                              │
└─────────────────────────────────────────────────────────────┘
                              ↓
┌─────────────────────────────────────────────────────────────┐
│   Simultaneously reducing transmission of vibration, which is │
│   generated during inducing the wobble motions to the sample, │
│   to X-ray diffractometer                                   │
│                            550                              │
└─────────────────────────────────────────────────────────────┘
```

FIG. 5

APPARATUS AND METHOD FOR INDUCING HIGH-SPEED VARIABLE-TILT WOBBLE MOTIONS

BACKGROUND

The present disclosure and embodiments thereof are in the field of X-ray diffraction, an analytical technique that is widely used for identifying and quantifying crystalline phases present in materials. More particularly, the present disclosure relates to an apparatus and method for inducing high-speed and variable-tilt wobble motions necessary for randomizing the orientations of the crystallites present in a sample of interest, either in bulk or powder form, thereby enabling phase identification and quantification.

It is important to identify and quantify crystalline phases to understand structure-property relationships which impact final application of the material, for example ensuring reliability during production or for engineering new materials. It is also necessary to determine unknown phases formed in a material, i.e. corrosion products. The materials and their products can be used in a variety of industries and applications, which include aerospace, automotive, biomedical, ceramics, electronics, energy, metal processing, optics, and semiconductor and packaging.

Most X-ray diffraction analysis is carried out using the reflection geometry, where an X-ray source and X-ray detector are placed on either side of the sample and moved in an angular fashion, during measurement, in the same plane as the sample. The X-rays from the source are scattered or diffracted off the sample onto the X-ray detector.

An ideal sample of interest for X-ray diffraction, based on the reflection geometry, consists of randomly oriented crystallites in a powder form, where the size of the crystallites ranges from 1 to 5 microns. In reality, many samples of interest for X-ray diffraction analysis, including those in powder form, are not ideal, either because the crystallites of the samples are larger than the incoming X-ray beam used during analysis or because the crystallites in the sample are oriented along certain directions, in other words, showing crystallographic texture. As a result, incomplete or missing Debye rings are generated during the analysis process, thereby causing erroneous results during phase identification and quantification. Certain samples can be processed in a destructive manner, i.e., ground or broken down into a fine free flowing powder, for reducing the effects of crystallographic texture.

A known industry method for reducing the effects of crystallographic texture during X-ray diffraction analysis is the capillary spinner method. According to this method, a sample is broken down into a free-flowing fine powder and inserted into an X-ray transparent capillary tube. The tube is sealed at both ends, and then spun at a high speed thereby randomizing the various crystallite orientations during analysis. There are obvious inherent deficiencies associated with this method. Firstly, the sample needs to be broken into a fine powder form, which destroys the integrity of the sample and is thus destructive. Therefore, this method is not applicable to bulk samples or powders that cannot be altered in any shape or form. Secondly, the crystalline phases present in the sample can be altered or changed during sample processing, thereby preventing identification of the phases originally present in the sample.

In the case of samples that cannot be destroyed for measurement or converted into a powder form, a non-destructive method, called the wobble method, is used to reduce the effects of crystallographic texture during X-ray diffraction analysis. This is achieved by simultaneously rotating and tilting the sample during analysis, while maintaining a constant sample height at the instrument center or test center of the X-ray diffractometer. This wobble motion method does not change the shape or form of the sample and thus, is truly non-destructive. The method can effectively randomize the various crystallite orientations present in the sample relative to the X-ray source and detector, similar to the capillary spinner method, but without any sample modification or alteration. The wobble motions can be created and controlled according to special sequences as necessary.

Wobble motions can be created by using a cradle stage equipped on standard X-ray diffractonieters. However, there are certain disadvantages when using the cradle stage for this wobble motion. For example, the cradle stage is not designed for continuous tilt and rotation motions during measurement, although it is possible to create such motions. The wobble motions created using a cradle stage are slow, which extends analysis time and limits sample throughput. In addition, when a sample is tilted upwards, high torque is applied on gear assemblies of the cradle stage. Cradle stages typically utilize stepper motors for enabling precise positioning of the sample during analysis, which render the cradle stage unsuitable for creating continuous motions during sample analysis. In addition, continuous motions lead to excessive heat generation and significant wear and tear of the stepper motors and the gear assemblies, thereby damaging the cradle stage.

Accordingly, there exists a need to overcome the deficiencies and limitations described hereinabove with respect to the conventional destructive method and apparatus for reducing the effects of crystallographic texture, and the limitations of creating wobble motions on a standard cradle stage.

SUMMARY

In one aspect of the present application, an apparatus for inducing high-speed wobble motions to a sample, for identifying and quantifying crystalline phases present in materials that constitute a sample, by using an X-ray diffractometer, is described. The X-ray diffractometer has a predefined testing center. The apparatus includes a position adjustment structure disposed on a part of the X-ray diffractometer. The position adjustment structure is configured to adjust the position of the sample with respect to the X-ray diffractometer, such that a surface center of the sample is aligned with the testing center of the X-ray diffractometer in a space defined by a longitudinal axis, a lateral axis and a vertical axis. The apparatus further includes a hexapod stage disposed on the position adjustment structure, wherein the hexapod stage is configured to tilt the sample. The apparatus further includes a rotation stage disposed on the hexapod stage, wherein the rotation stage is configured to rotate the sample about a rotation axis that is substantially perpendicular to a planar top surface of the hexapod stage. The apparatus also includes a sample mounting block disposed on the rotation stage, wherein the sample mounting block has a top surface on to which the sample is securely mounted. The sample tilt and rotation motions are created simultaneously by the hexapod and rotation stage respectively, and the position adjustment center is actively correcting for any deviation between the surface center of the sample and testing center of the diffractometer during the tilt and rotation motions. This results in a position-corrected variable-tilt wobble motion that randomizes the different orientations of the sample crystallites relative to the X-ray source and detector during analysis.

In another aspect of the present application, a method for inducing high-speed wobble motions to a sample, for identifying and quantifying crystalline phases present in materials that constitute a sample, by using an X-ray diffractometer, is described. The X-ray diffractometer has a pre-defined testing center. The method includes: securely supporting the sample on a sample mounting block; tilting the sample by using a hexapod stage; rotating the sample about a rotation axis that is substantially perpendicular to a planar top surface of the hexapod stage; and adjusting the position of the sample with respect to the X-ray diffractometer, such that a surface center of the sample is aligned with the testing center of the X-ray diffractometer in a space defined by a longitudinal axis, a lateral axis and a vertical axis. The sample tilt and rotation motions are created simultaneously by the hexapod and rotation stage respectively, and the position adjustment center is actively correcting for any deviation between the surface center of the sample and testing center of the diffractometer during the tilt and rotation motions. This results in a position corrected variable tilt wobble motion that helps to randomize the different orientations of the sample crystallites relative to the X-ray source and detector during analysis.

In yet another aspect of the present application, an X-ray diffraction device, for identifying and quantifying crystalline phases of a material of a sample through X-ray diffraction, is provided. The device includes an X-ray diffractometer and an apparatus for inducing high-speed wobble motions to the sample. The X-ray diffractometer includes a source for generating electromagnetic radiation or X-ray beams, and a detector for sensing an intensity of the electromagnetic radiation or the X-ray beams generated by the source and diffracted by the sample. The X-ray diffractometer has a pre-defined testing center. The apparatus for inducing high-speed wobble motions to the sample includes a position adjustment structure disposed on a part of the X-ray diffractometer. The position adjustment structure is configured to adjust the position of the sample with respect to the X-ray diffractometer, such that a surface center of the sample is aligned with the testing center of the X-ray diffractometer in a space defined by a longitudinal axis, a lateral axis and a vertical axis. The apparatus for inducing high-speed wobble motions to the sample further includes a hexapod stage disposed on the position adjustment structure. The hexapod stage is configured to tilt the sample. The apparatus for inducing high-speed wobble motions to the sample further includes a rotation stage disposed on the hexapod stage. The rotation stage is configured to rotate the sample about a rotation axis that is substantially perpendicular to a planar top surface of the hexapod stage. The apparatus for inducing high-speed wobble motions to the sample further includes a sample mounting block disposed on the rotation stage. The sample mounting block has a top surface on which the sample is securely mounted. The sample tilt and rotation motions are created simultaneously by the hexapod and rotation stage respectively, and the position adjustment center is actively correcting for any deviation between the surface center of the sample and testing center of the diffractometer during the tilt and rotation motions. This results in a position corrected variable tilt wobble motion that helps to randomize the different orientations of the sample crystallites relative to the X-ray source and detector during analysis.

DETAILED DESCRIPTION OF EMBODIMENTS

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

Detailed embodiments of the methods and apparatuses of the present disclosure are described herein; however, it is to be understood that the disclosed embodiments are merely illustrative of the disclosed methods and apparatuses that may be embodied in various forms. In addition, each of the examples given in connection with the various embodiments of the disclosure are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure. For the purposes of the description hereinafter, the terms "upper", "lower", "top", "bottom", and derivatives thereof shall relate to the disclosed structures, as they are oriented in the drawing figures.

Figure 1:
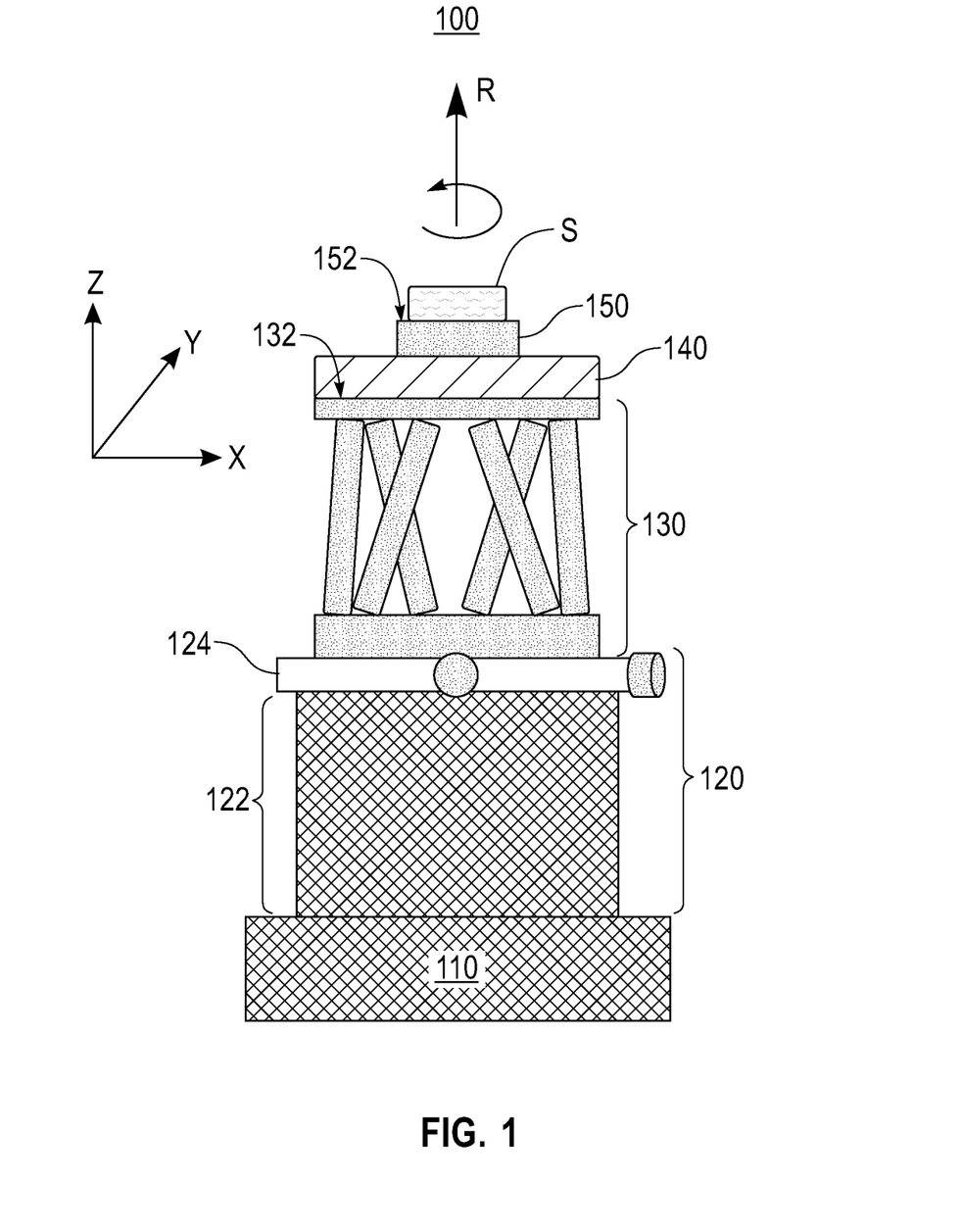
FIG. 1 is a schematic front elevation view of an apparatus for inducing high-speed wobble motions to a sample, according to an exemplary embodiment of the present disclosure.

FIG. 1 is a schematic front elevation view of an apparatus 100 according to an exemplary embodiment of the present disclosure. The apparatus 100 is operative to induce high-speed variable-tilt wobble motions to a sample S of interest for identifying and quantifying crystalline phases of a material of the sample S by using the X-ray diffraction technology. The sample S can be any sample of interest used in a variety of industries and applications, which include aerospace, automotive, biomedical, ceramics, electronics, energy, metal processing, optics, and semiconductor and packaging. For example, the sample S can be a polycrystalline material, polymer, ceramic, metals, alloys, composite, thin-films, bulk, powders and the like.

Figure 2:
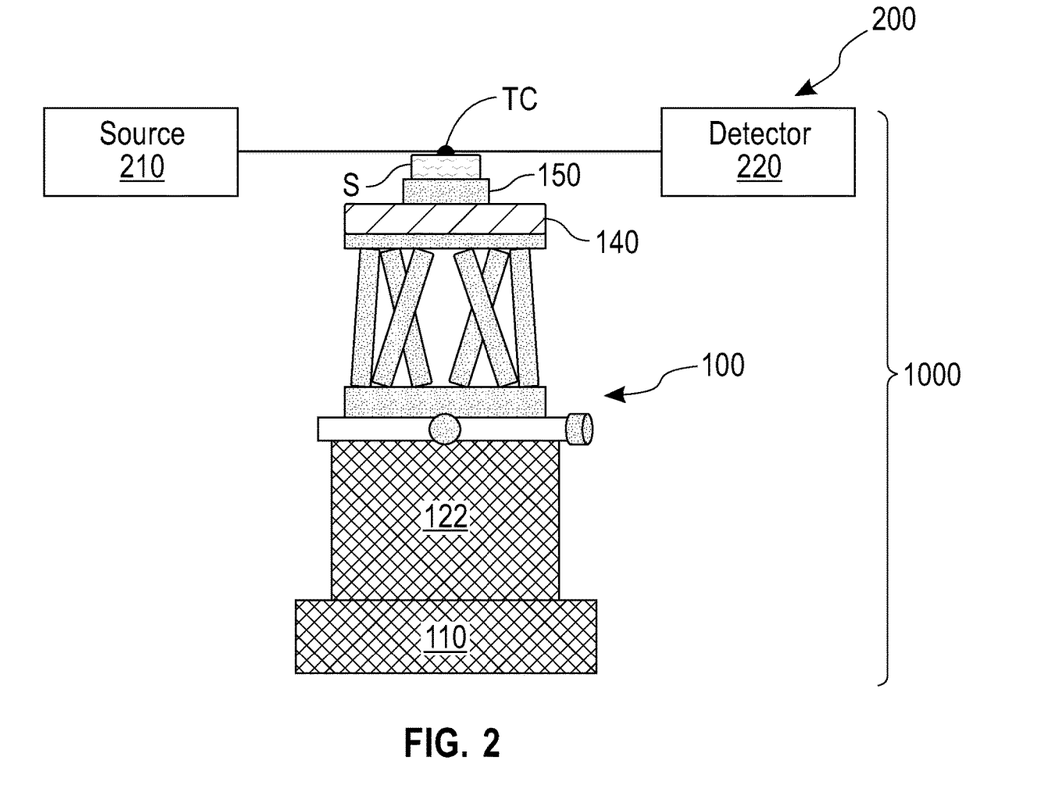
FIG. 2 is a schematic front elevation view of the apparatus, as shown in FIG. 1, being used in an X-ray diffractometer.

FIG. 2 is a schematic front elevation view of an X-ray diffraction device 1000 according to another exemplary embodiment of the present disclosure. The X-ray diffraction device 1000 includes the apparatus 100 and an X-ray diffractometer 200 according to yet another exemplary embodiment of the present disclosure. The X-ray diffractometer 200 is used with the apparatus 100 for implementing a testing based on X-ray diffraction. The X-ray diffractometer 200 includes a source 210 and a detector 220.

The source 210 can be any device, which is configured to produce or supply electromagnetic radiation or X-ray beams toward the detector 220 and optionally, the apparatus 100. The source 210 includes, but is not limited to, a Sealed X-ray Tube, Rotating anode, microfocus X-ray tube, microfocus rotating anode, or other similar X-ray sources, utilizing single or multiple solid targets (liquid or solid or both) to produce X-rays of desired wavelength/wavelengths.

The detector 220 can be any suitable device, which is configured to sense an intensity of electromagnetic radiation or X-ray beams generated by the source 210 and diffracted by the sample S. The detector 220 can be gas based or silicon strip/semiconductor based. The detector 220 can be a 2D X-ray detector, 1D X-ray detector, 0D X-ray detector, a combined 1D/0D X-ray detector, or a combined 2D/1D/0D X-ray detectors. Due to the provision of the apparatus 100 (which is capable of inducing high speed, variable-tilt wobble motions to the sample S to minimize the crystallographic texture of the sample), a 1D X-ray detector or a 0D X-ray detector can be particularly suitable. An exemplary detector 220 can include, but is not limited to, Scintillation detectors (e.g., offered by Bruker AXS, Panalytical, Rigaku or other vendors), PIXcel® (offered by Panalytical), X'Celerator® (offered by Panalytical), Vantec™ (offered by Bruker AXS), LynxEye™/LynxEye XE™ (offered by Bruker AXS), D/Tex™ (offered by Rigaku), Hypix® 3000 (offered by Rigaku), etc.

The X-ray diffractometer 200 has a pre-defined testing center TC, which is determined taking into consideration the position and property of the source 210, the detector 220 and/or the apparatus 100. For example, the testing center TC can be determined by positioning an alignment fixture (not shown) on the apparatus 100 and applying a camera (or any suitable visual device) to observe motions of the alignment fixture. The X-ray diffractometer 200 can include any other suitable structure, features and implements, as understood by a skilled person in the art.

As shown in FIG. 1, the apparatus 100 includes a vibration dampener 110, which is connected to or formed integrally with a part of the X-ray diffractometer 200 in a stationary manner. The vibration dampener 110 provides a foundation or base for the entire apparatus 100, and is configured to reduce transmission of vibration generated by the apparatus 100 to the X-ray diffractometer 200 or any other parts of the X-ray diffraction device 1000. In practice, the vibration generated by the apparatus 100 may cause undesirable misalignment of X-ray optical or related hardware components present in X-ray diffractometer 200.

Figure 3:
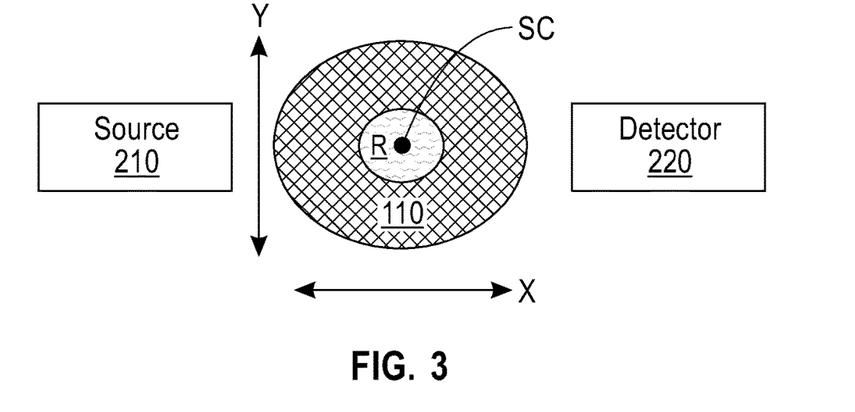
FIG. 3 is a schematic top-down plan view of the X-ray diffraction device shown in FIG.

The apparatus 100 further includes a position adjustment structure 120, which is disposed on the vibration dampener 110, either directly or indirectly with one or more intervening structures provided therebetween. The position adjustment structure 120 is configured to adjust the position of the sample S with respect to the X-ray diffractometer 200, such that a surface center SC (shown in FIG. 3) of the sample S is aligned with the testing center TC of the X-ray diffractometer 200 in a space defined by a longitudinal axis X, a lateral axis Y and a vertical axis Z. Within the scope of the present disclosure, the term "surface center SC" can be used to designate any suitable surface point of the sample S, depending on the shape and profile of the sample and circumstances of applications of the sample.

The apparatus 100 further includes a hexapod stage 130 disposed on the position adjustment structure 120, either directly or indirectly with one or more intervening structures provided therebetween. The hexapod stage 130, for example, can be a Stewart Platform as known in the relevant art. The hexapod stage 130 is configured to generate rapid and precisely-controlled motions of the sample S. In practice, the hexapod stage 130 is capable of continuously or intermittently tilting the sample S in a controlled manner. Furthermore, the hexapod stage 130 can change or adjust the tilting angles of the sample S in a controlled manner, such that variable tilting of the sample S can be achieved. In an embodiment, the hexapod stage 130 is configured to tilt the sample S in a range 1° of to 60°, for example, with respect to the surface center SC of the sample S as a pivot point. However, the pivot point is not limited to the surface center SC. In addition, the hexapod stage 130 can continuously or intermittently rotate the sample S about the vertical axis Z (or a rotation axis, which will be described later) in a limited range. In addition, the power and capacity of the hexapod stage 130 can be selected to support a variety of sample loads.

Figure 4:
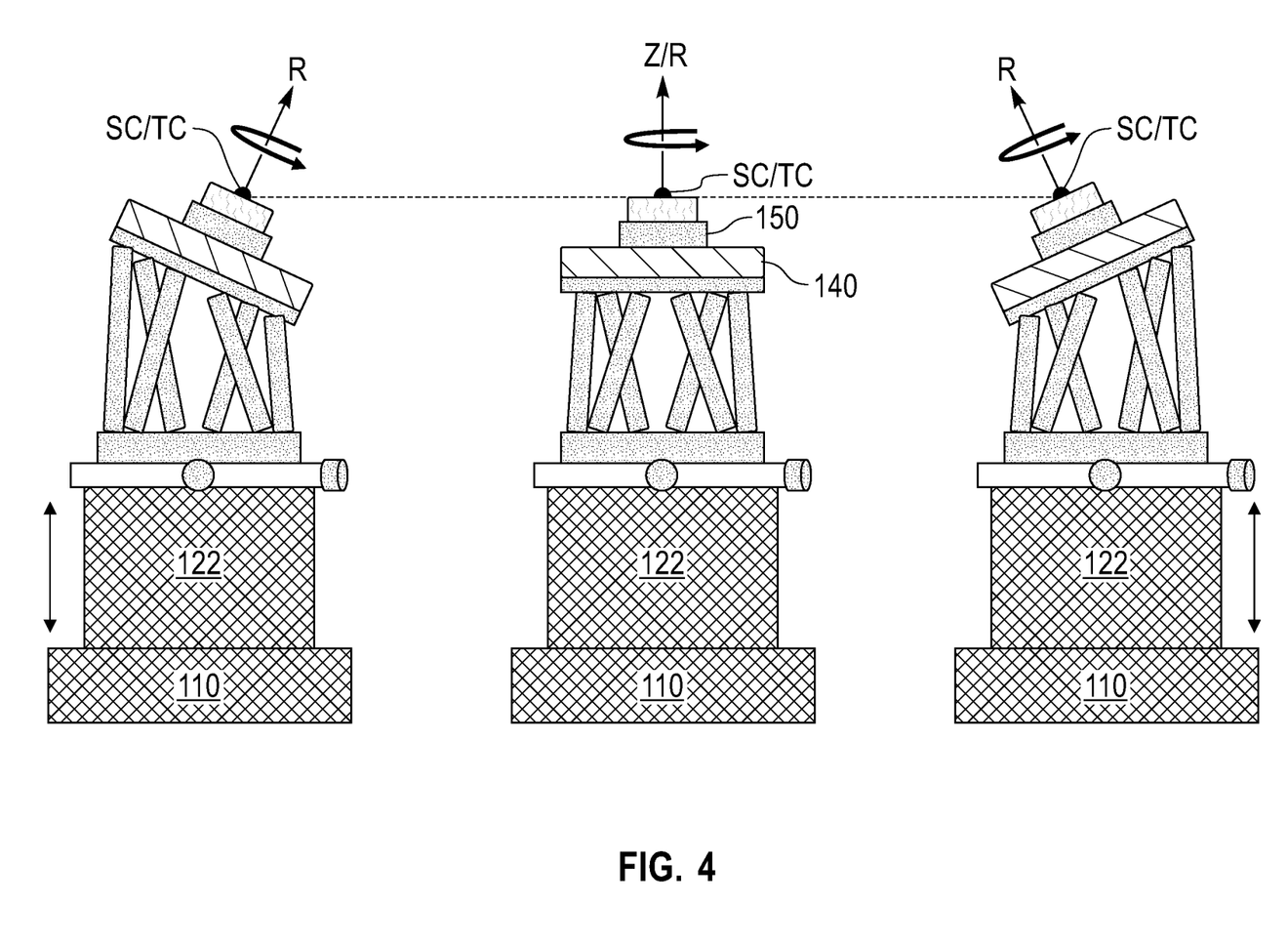
FIG. 4 is a schematic diagram showing the operation of the apparatus shown in FIG. 1.

The apparatus 100 further includes a rotation stage 140 disposed on the hexapod stage 130, either directly or indirectly with one or more intervening structures provided therebetween. In the shown embodiment, the rotation stage 140 is attached to, or formed integrally with, a top planar surface 132 of the hexapod stage 130. The rotation stage 140 is configured to continuously or intermittently rotate the sample S about a rotation axis R at a relatively high speed. For example, the rotation stage 140 is configured to rotate the sample S at a speed in a range of 10 rpm to 1000 rpm. In addition, the power and capacity of the rotation stage 140 can be selected to support a variety of sample loads. The rotation axis R is defined, in the shown embodiment, as substantially perpendicular to the planar top surface 132 of the hexapod stage 130. Thus, the rotation axis R is variable as the hexapod stage 130 operates to tilt the sample S. The variably tiling movements of the sample S (generated by the hexapod stage 130) and the high-speed rotation of the sample S (generated by the rotation stage 140), in concert, generate high-speed, variable-tilt wobble motions of the sample S. The high-speed, variable-tilt wobble motions of the sample S can effectively eliminate or minimize the crystallographic texture effect of the sample S, which is desirable for identifying and quantifying crystalline phases of one or more materials of the sample S during an X-ray diffraction testing. Within the scope of the present disclosure, the rotation axis of the rotation stage 140 can be defined with respect to a surface of the sample S, a surface of the rotation stage 140 per se, or a surface of a sample mount block (as described in the following paragraph). Examples of the rotation axis R are shown in FIG. 4.

The apparatus 100 further includes a sample mounting block 150 disposed on the rotation stage 140, either directly or indirectly with one or more intervening structures provided therebetween. The sample mounting block 150 has a top surface 152, on which the sample S is securely mounted by any suitable means known in the art.

In the shown embodiment, the position adjustment structure 120 includes a height adjustment stage 122, which is disposed on the vibration dampener 110, either directly or indirectly with one or more intervening structures provided therebetween. The height adjustment stage 122 is configured to adjust a vertical position of the surface center SC of the sample S along the vertical axis Z. As a result, the vertical position of the surface center SC of the sample S can be aligned with the vertical position of the testing center TC, when the hexapod stage 130 tilts the sample S and/or when the rotation stage 140 rotates the sample S. The height adjustment stage 122 is configured to move the sample S along the vertical axis Z by a distance, which can be in a range of 0.1 mm to 500 mm.

The position adjustment structure 120 further includes a translation stage 124, which is disposed on the height adjustment stage 122, either directly or indirectly with one or more intervening structures provided therebetween. The translation stage 124 is configured to adjust a plane position of the surface center SC of the sample S in the plane defined by the longitudinal axis X and the lateral axis Y, such that the plane position of the surface center SC of the sample S is aligned with the plane position of the testing center TC, when the hexapod stage 130 tilts the sample S and/or when the rotation stage 140 rotates the sample S.

When the apparatus 100 is in use, as the hexapod stage 130 variably tilts the sample S, the surface center SC can be moved in longitudinal axis X, the lateral axis Y and/or the vertical axis Z. As a result, the surface center SC is no longer aligned with the testing center TC of the diffractometer 200. In this scenario, the position adjustment structure 120 (including the height adjustment stage 122 and the translation stage 124) is operated to instantaneously and responsively align the surface center SC with the testing center TC.

In an alternative embodiment not shown in the figures, the relative position of the height adjustment stage and the translation stage is vertically reversed, such that translation stage is disposed on the vibrations dampener and the height adjustment stage is disposed on the translation stage.

FIG. 4 is a schematic diagram showing three different operational configurations of the apparatus 100, in use, although many more operational configurations can be provided by the apparatus 100. Each operational configuration represents a state of the apparatus 100 and the sample S, in which the sample S is simultaneously tilted and rotated (i.e., wobbled) in a controlled manner. As shown, in each operational configuration, the surface center SC of the sample S and the testing center TC of the X-ray diffractometer 200 are aligned, due to the operations of the height adjustment stage 122 and the translation stage 124. In addition, in the different operational configurations, the rotations axis R is defined individually with respect to the top surface of the hexapod stage, which can overlap the vertical axis Z in certain configurations.

Figure 5:
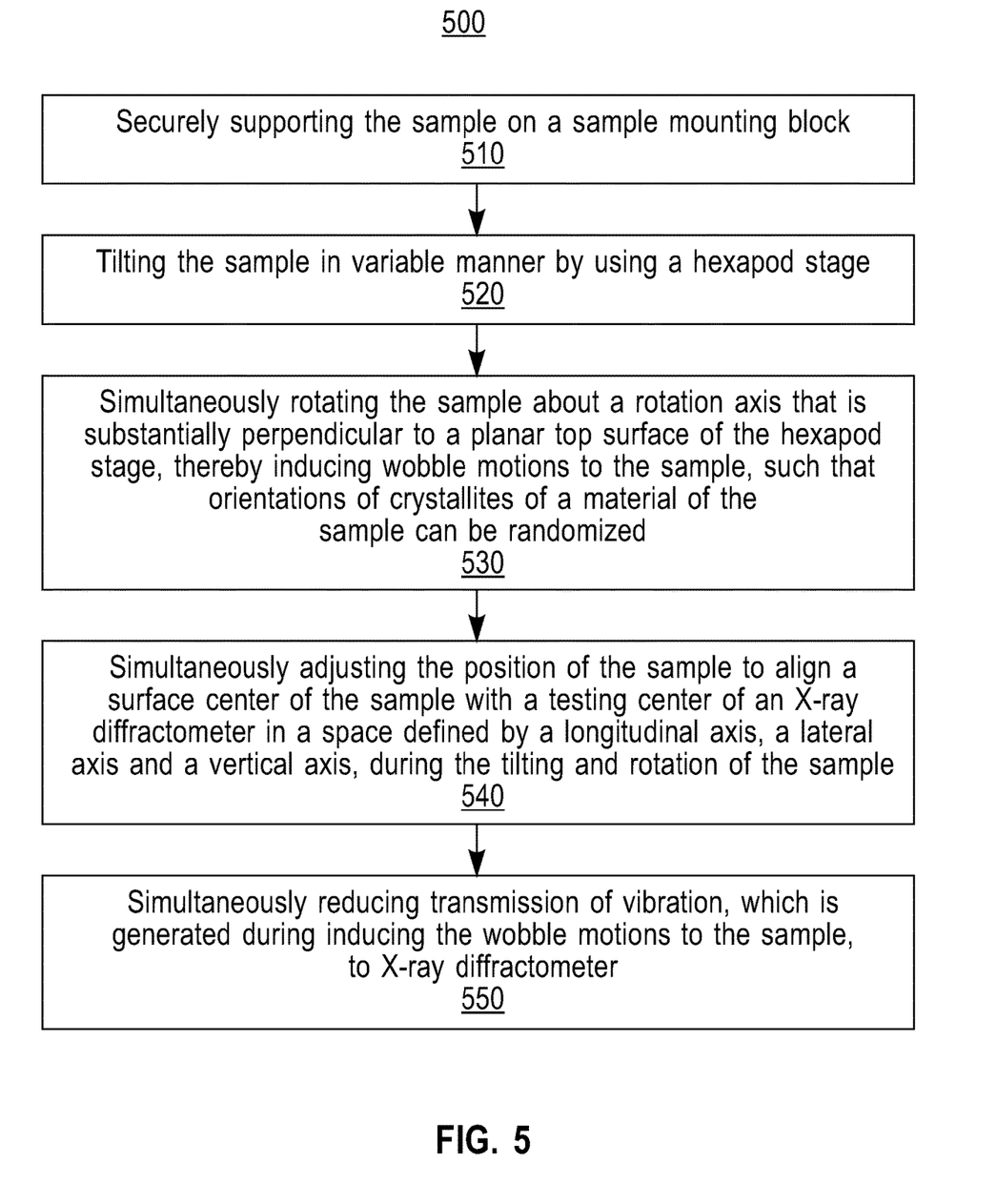
FIG. 5 is a flow chart showing a method for inducing high-speed wobble motions to a sample, according to still another exemplary embodiment of the present disclosure.

FIG. 5 is a flow chart showing a method 500 for inducing high-speed wobble motions to a sample for identifying and quantifying crystalline phases of a material of the sample by using an X-ray diffractometer. The method 500 is now described with respect to the apparatus 100, the X-ray diffractometer 200 having the pre-defined testing center TC, and the sample S having the surface center SC.

At step 510, the sample S is securely supported on the sample mounting block 150. For example, the sample S can be securely attached to the top surface 152 of the sample mounting block 150.

At step 520, the sample S is tilted, in a variable manner, by the hexapod stage 130. For example, the sample S can be pivoted with respect to the surface center SC of the sample S as a pivot point, in a range of 1° to 60°.

At step 530, the sample S is rotated, at a high speed, about a rotation axis that is substantially perpendicular to the planar top surface 132 of the hexapod stage 130. For example, the sample S is tilted and rotated simultaneously to induce wobble motions to the sample, such that orientations of crystallites of the material of the sample can be randomized. For example, the sample S can be rotated at a speed in a range of 10 rpm to 1000 rpm.

At step 540, the position of the sample S is simultaneously adjusted with respect to the X-ray diffractometer, such that the surface center SC of the sample S is aligned with the testing center TC of the X-ray diffractometer in a space defined by a longitudinal axis X, a lateral axis Y, and a vertical axis Z. The position of the sample can be adjusted by adjusting a vertical position of the surface center SC of the sample S along the vertical axis Z, such that the vertical position of the surface center SC is aligned with the vertical position of the testing center TC when the hexapod stage tilts the sample. The position of the sample can be further adjusted by adjusting a plane position of the surface center SC of the sample S in the plane defined by the longitudinal axis X and the lateral axis Y, such that the plane position of the surface center SC of the sample is aligned with the plane position of the testing center TC when the hexapod stage tilts the sample. For example, the position of the sample S can be adjusted simultaneously with the tilting of the sample S and the rotation of the sample S. For example, the vertical position of the surface center SC of the sample S can be adjusted by moving the sample S along the vertical axis Z by a distance that is in a range of 0.1 mm to 500 mm.

At step 550, the transmission of vibration, which is generated by the apparatus 100 during the process of inducing the wobble motions to the sample S, to the X-ray diffractometer 200 is simultaneously reduced by the vibration dampener 110 of the apparatus 100.

While the present application has been particularly shown and described with respect to various embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. An apparatus for inducing high-speed wobble motions to a sample for identifying and quantifying crystalline phases of a material of the sample by using an X-ray diffractometer, wherein the X-ray diffractometer has a pre-defined testing center, the apparatus comprising:
    a position adjustment structure disposed on a part of the X-ray diffractometer, wherein the position adjustment structure is configured to adjust the position of the sample with respect to the X-ray diffractometer, such that a surface center of the sample is aligned with the testing center of the X-ray diffractometer in a space defined by a longitudinal axis, a lateral axis and a vertical axis;
    a hexapod stage disposed on the position adjustment structure, wherein the hexapod stage is configured to tilt the sample;
    a rotation stage disposed on the hexapod stage, wherein the rotation stage is configured to rotate the sample about a rotation axis that is substantially perpendicular to a planar top surface of the hexapod stage; and
    a sample mounting block disposed on the rotation stage, wherein the sample mounting block has a top surface on which the sample is securely mounted,
    wherein the hexapod stage tilts the sample simultaneously with the rotation stage rotates the sample, such that wobble motions are induced to the sample for randomizing orientations of crystallites of the material.

2. The apparatus according to claim 1, wherein the position adjustment structure is configured to adjust the position of the sample simultaneously with the tilting of the sample and the rotation of the sample.

3. The apparatus according to claim 1,
    further comprising a vibration dampener connected to the part of the X-ray diffractometer in a stationary manner;

wherein the position adjustment structure is disposed on the vibration dampener; and wherein the vibration dampener is configured to reduce transmission of vibration generated by the apparatus to the X-ray diffractometer.

4. The apparatus according to claim 1, wherein the position adjustment structure comprises:

a height adjustment stage disposed on the vibration dampener, wherein the height adjustment stage is configured to adjust a vertical position of the surface center of the sample along the vertical axis, such that the vertical position of the surface center of the sample is aligned with the vertical position of the testing center when the hexapod stage tilts the sample; and a translation stage disposed on the height adjustment stage, wherein the translation stage is configured to adjust a plane position of the surface center of the sample in the plane defined by the longitudinal axis and the lateral axis, such that the plane position of the surface center of the sample is aligned with the plane position of the testing center when the hexapod stage tilts the sample.

5. The apparatus according to claim 1, wherein the position adjustment structure comprises:

a translation stage disposed on the vibration dampener, wherein the translation stage is configured to adjust a plane position of the surface center of the sample in the plane defined by the longitudinal axis and the lateral axis, such that the plane position of the surface center of the sample is aligned with the plane position of the testing center when the hexapod stage tilts the sample; and a height adjustment stage disposed on the translation stage, wherein the height adjustment stage is configured to adjust a vertical position of the surface center of the sample along the vertical axis, such that the vertical position of the surface center of the sample is aligned with the vertical position of the testing center when the hexapod stage tilts the sample.

6. The apparatus according to claim 1, wherein the hexapod stage is further configured to rotate the sample about the rotation axis in a limited range.

7. The apparatus according to claim 1, wherein the hexapod stage is configured to tilt the sample in a range of 1° to 60° with respect to the surface center of the sample as a pivot point.

8. The apparatus according to claim 1, wherein the rotation stage is configured to rotate the sample at a speed in a range of 10 rpm to 1000 rpm.

9. The apparatus according to claim 4, wherein the height adjustment stage is configured to move the sample along the vertical axis by a distance that is in a range of 0.1 mm to 500 mm.

10. The apparatus according to claim 5, wherein the height adjustment stage is configured to move the sample along the vertical axis by a distance that is in a range of 0.1 mm to 500 mm.

11. A method for inducing high-speed wobble motions to a sample for identifying and quantifying crystalline phases of a material of the sample by using an X-ray diffractometer, wherein the X-ray diffractometer has a pre-defined testing center, the method comprising:

securely supporting the sample on a sample mounting block;

tilting the sample by using a hexapod stage;

rotating the sample about a rotation axis that is substantially perpendicular to a planar top surface of the hexapod stage; and adjusting the position of the sample with respect to the X-ray diffractometer, such that a surface center of the sample is aligned with the testing center of the X-ray diffractometer in a space defined by a longitudinal axis, a lateral axis and a vertical axis;

wherein the tilting the sample and the rotating the sample are implemented simultaneously to induce wobble motions to the sample, such that orientations of crystallites of the material of the sample are randomized.

12. The method according to claim 11, wherein the adjusting the position of the sample is implemented simultaneously with the tilting the sample and the rotating the sample.

13. The method according to claim 11, further comprising reducing transmission of vibration, which is generated during inducing the wobble motions to the sample, to the X-ray diffractometer by using a vibration dampener.

14. The method according to claim 11, wherein the adjusting the position comprises:

adjusting a vertical position of the sample along the vertical axis, such that the vertical position of the sample is aligned with the vertical position of the testing center when the hexapod stage tilts the sample; and adjusting a plane position of the sample in the plane defined by the longitudinal axis and the lateral axis, such that the plane position of the sample is aligned with the plane position of the testing center when the hexapod stage tilts the sample.

15. The method according to claim 11, further comprising rotating the sample, by hexapod stage, about the rotation axis in a limited range.

16. The method according to claim 11, wherein the tilting the sample comprises tilting the sample in a range of 1° to 60° with respect to the surface center of the sample as a pivot point.

17. The method according to claim 11, wherein the rotating the sample comprises rotating the sample at a speed in a range of 10 rpm to 1000 rpm.

18. The method according to claim 14, wherein the adjusting the vertical position of the sample comprises moving the sample along the vertical axis by a distance that is in a range of 0.1 mm to 500 mm.

19. An X-ray diffraction device for identifying and quantifying crystalline phases of a material of a sample through X-ray diffraction, the device comprising:

an X-ray diffractometer comprising:

a source for generating electromagnetic radiation or X-ray beams, and a detector for sensing an intensity of the electromagnetic radiation or the X-ray beams generated by the source and diffracted by the sample, wherein the X-ray diffractometer has a pre-defined testing center; and an apparatus for inducing high-speed wobble motions to the sample, the apparatus comprising:

a position adjustment structure disposed on a part of the X-ray diffractometer, wherein the position adjustment structure is configured to adjust the position of the sample with respect to the X-ray diffractometer, such that a surface center of the sample is aligned with the testing center of the X-ray diffractometer in a space defined by a longitudinal axis, a lateral axis and a vertical axis, a hexapod stage disposed on the position adjustment structure, wherein the hexapod stage is configured to tilt the sample, a rotation stage disposed on the hexapod stage, wherein the rotation stage is configured to rotate the sample about a rotation axis that is substantially perpendicular to a planar top surface of the hexapod stage, and a sample mounting block disposed on the rotation stage, wherein the sample mounting block has a top surface on which the sample is securely mounted, wherein the hexapod stage tilts the sample simultaneously with the rotation stage rotates the sample, such that wobble motions are induced to the sample for randomizing orientations of crystallites of the material.

\* \* \* \* \*